(12) United States Patent
Lee

(10) Patent No.: US 12,381,288 B2
(45) Date of Patent: Aug. 5, 2025

(54) BUSBAR MODULE AND METHOD OF MANUFACTURING THE SAME

(71) Applicant: LG Energy Solution, Ltd., Seoul (KR)

(72) Inventor: Hanyoung Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 885 days.

(21) Appl. No.: 17/434,541

(22) PCT Filed: Dec. 4, 2019

(86) PCT No.: PCT/KR2019/017023
§ 371 (c)(1),
(2) Date: Aug. 27, 2021

(87) PCT Pub. No.: WO2020/197040
PCT Pub. Date: Oct. 1, 2020

(65) Prior Publication Data
US 2022/0140448 A1  May 5, 2022

(30) Foreign Application Priority Data

Mar. 26, 2019 (KR) .................. 10-2019-0034610

(51) Int. Cl.
*H01M 50/507* (2021.01)
*H01M 50/204* (2021.01)
(Continued)

(52) U.S. Cl.
CPC ....... *H01M 50/507* (2021.01); *H01M 50/204* (2021.01); *H01M 50/249* (2021.01);
(Continued)

(58) Field of Classification Search
CPC ............. H01M 50/507; H01M 50/521; H01M 50/503; H01M 50/204; H01M 2220/02;
(Continued)

(56) References Cited

U.S. PATENT DOCUMENTS 10,497,920 B2   12/2019   Lim et al.
10,957,895 B2   3/2021    Yanagida
(Continued)

FOREIGN PATENT DOCUMENTS

CN   105358287 A   2/2016
CN   206040783 U   3/2017
(Continued)

OTHER PUBLICATIONS

Extended European Search Report including Written Opinion for Application No. 19920917.2 dated Mar. 10, 2022, pp. 1-6.
(Continued)

*Primary Examiner* — Basia A Ridley
*Assistant Examiner* — Jonathan William Estes
(74) *Attorney, Agent, or Firm* — Lerner David LLP

(57) ABSTRACT

A busbar module includes: a busbar including an upper plate and a lower plate overlapping with the upper plate; an electrode lead positioned between the upper plate and the lower plate; and a connecting part disposed between the upper plate and the electrode lead to electrically connect the upper plate and the electrode lead, wherein a through hole is formed in the lower plate, and the connecting part is disposed at a position corresponding to the through hole.

11 Claims, 6 Drawing Sheets

(51) Int. Cl.
    *H01M 50/249*    (2021.01)
    *H01M 50/50*    (2021.01)
    *H01M 50/503*    (2021.01)
    *H01M 50/521*    (2021.01)
    *H01M 50/567*    (2021.01)
    *H01M 50/574*    (2021.01)

(52) U.S. Cl.
    CPC ......... *H01M 50/50* (2021.01); *H01M 50/503* (2021.01); *H01M 50/521* (2021.01); *H01M 50/567* (2021.01); *H01M 50/574* (2021.01); *H01M 2220/20* (2013.01)

(58) Field of Classification Search
    CPC .. H01M 50/249; H01M 50/561; H01M 50/50; H01M 50/574; H01M 50/509
    See application file for complete search history.

(56) References Cited

U.S. PATENT DOCUMENTS

| | | | |
|---|---|---|---|
| 10,978,768 B2 | 4/2021 | Lim et al. | |
| 2016/0151853 A1 | 6/2016 | Lee et al. | |
| 2016/0233476 A1 | 8/2016 | Okamoto et al. | |
| 2018/0212214 A1* | 7/2018 | Sakai | H01M 10/425 |
| 2018/0269459 A1 | 9/2018 | Tsuchiya et al. | |
| 2018/0287316 A1 | 10/2018 | Robert et al. | |
| 2018/0301685 A1 | 10/2018 | Jeon | |
| 2018/0331345 A1 | 11/2018 | Lim et al. | |
| 2018/0358601 A1* | 12/2018 | Yanagihara | H01M 10/482 |
| 2019/0006645 A1 | 1/2019 | Kim | |
| 2019/0067662 A1 | 2/2019 | Sato | |
| 2020/0106075 A1 | 4/2020 | Yanagida | |

FOREIGN PATENT DOCUMENTS

| | | | |
|---|---|---|---|
| CN | 109428039 A | | 3/2019 |
| DE | 102014200197 A1 | | 7/2015 |
| JP | 863292568 A | | 11/1988 |
| JP | 2007265945 A | | 10/2007 |
| JP | 2008251260 A | | 10/2008 |
| JP | 201354915 A | | 3/2013 |
| JP | 2014022195 A | | 2/2014 |
| JP | 2016136504 A | | 7/2016 |
| JP | 2016189323 A | | 11/2016 |
| JP | 6110582 B1 | | 4/2017 |
| JP | 2018106806 A | | 7/2018 |
| KR | 20070049255 A | | 5/2007 |
| KR | 2013-0051166 A | | 5/2013 |
| KR | 20150021272 A | | 3/2015 |
| KR | 20150028073 A | | 3/2015 |
| KR | 20160076156 A | | 6/2016 |
| KR | 20160092691 A | | 8/2016 |
| KR | 20160097013 A | | 8/2016 |
| KR | 101715695 | * | 3/2017 |
| KR | 20180091446 | * | 8/2018 |
| KR | 20180091446 A | | 8/2018 |
| KR | 20180115077 A | | 10/2018 |
| KR | 20180116958 A | | 10/2018 |
| KR | 101916433 B1 | | 11/2018 |
| KR | 20180125089 A | | 11/2018 |

OTHER PUBLICATIONS

International Search Report for PCT/KR2019/017023 mailed Mar. 23, 2020; 3 pages.
Search Report dated Aug. 7, 2023 from Office Action for Chinese Application No. 201980094663.5 issued Aug. 9, 2023. 3 pgs. (see p. 2-3, categorizing the cited references).

* cited by examiner

BUSBAR MODULE AND METHOD OF MANUFACTURING THE SAME

CROSS-REFERENCE TO RELATED APPLICATIONS

This application is a national phase entry under 35 U.S.C. § 371 of International Application No. PCT/KR2019/017023, filed on Dec. 4, 2019, published in Korean, which claims the benefit of priority based on Korean Patent Application No. 10-2019-0034610 filed with the Korean Intellectual Property Office on Mar. 26, 2019, the disclosures of which are incorporated herein by reference.

TECHNICAL FIELD

The present disclosure relates to a busbar module and a method for manufacturing the same, and more particularly, to a busbar module with improved connection between an electrode lead and a busbar, and a method for manufacturing the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode anode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified into a prismatic secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium to large-sized device such as an automobile, a battery pack in which a large number of battery cells are electrically connected is used.

This battery pack usually includes a plurality of secondary batteries, and the plurality of secondary batteries are connected to each other in series and in parallel to enhance the capacity and output. In this case, the battery pack may include a busbar module for electrical connection between the plurality of secondary batteries, i.e., battery cells. The busbar module includes an electrode lead connected to each of the battery cells, and a busbar for connecting the electrode leads to each other, and may be formed on one side of a battery module including a plurality of battery cells which are stacked.

FIG. 1 is a plan view of a conventional busbar module, and FIG. 2 is a cross-sectional view of the busbar module taken along line A-A' in FIG. 1. For the convenience of description, only necessary components are shown.

Referring to FIGS. 1 and 2, in case of the conventional busbar module, electrode leads 40, which are respectively connected to a plurality of battery cells (not shown), are electrically connected to each other via a busbar 10. To this end, the electrode leads 40 and the busbars 10 are welded together, and more specifically, the electrode leads 40 are bent and then are welded to the upper surface of the busbars 10. Ultrasonic welding, laser welding or resistance welding may be used for such welding.

On the other hand, when the secondary battery is exposed to a high temperature, or a large current flows within a short time due to overcharge, external short circuit, nail-penetration, local crush or the like, there is a danger of an explosion of the battery while the secondary battery being heated by IR heat. In other words, when the pressure or temperature of the battery rises, the decomposition reaction of the active material and a number of side reactions proceed. This results in a sharp rise in the temperature of the battery, which again accelerates the reactions between the electrolyte and the electrodes. Eventually, a thermal runaway phenomenon occurs in which the temperature of the battery rapidly rises. If the temperature rises to a certain level or higher, ignition of the battery may occur, and the secondary battery may explode due to the increased internal pressure of the battery.

Therefore, when the secondary battery is placed in an abnormal operating state such as an overcurrent state or a high temperature state, it may be provided with a current interruptive device (CID) for blocking electric current.

However, in case of applying the current interruptive device (CID) to a medium to large-sized battery pack including a plurality of battery cells, there are some problems as follows:

In the case of the current interruptive device (CID) used in a conventional small-sized battery, safety is secured by using the principle that when the internal pressure of the battery cell increases, a specific part is disconnected to block the current. However, when applied to a medium to large-sized battery pack, there is a problem that the resistance becomes too large.

In addition, in the case of the current interruptive device (CID) applied to a prismatic battery cell of a medium to large-sized battery pack, if the internal pressure of the battery cell increases, the current is blocked in the way that an external short circuit is forcibly generated to melt the electrode lead of the battery cell. However, this has a problem in that it operates even when the internal pressure of the cell increases during the end-of-life (EOL) period.

DETAILED DESCRIPTION OF THE INVENTION

Technical Problem

The present disclosure has been made to solve the problems as mentioned above, and, therefore, it is an object of the present disclosure to provide a busbar module capable of effectively blocking current in an abnormal operating state without increasing resistance in a normal operating state, and a method of manufacturing the same.

Technical Solution

A busbar module according to one embodiment of the present disclosure includes: a busbar including an upper plate and a lower plate overlapping with the upper plate; an electrode lead positioned between the upper plate and the lower plate; and a connecting part disposed between the upper plate and the electrode lead to electrically connect the upper plate and the electrode lead, wherein a through hole is formed in the lower plate, and wherein the connecting part is disposed at a position corresponding to the through hole.

The connecting part may include a material whose volume shrinks when the temperature rises.

The material may be a shape memory alloy.

The connecting part may have a shape which changes according to a temperature rise.

The connecting part may include a shape memory alloy whose shape changes according to a temperature rise.

The connecting part may extend from the upper plate toward the lower plate, and the electrode lead may include a protrusion projecting into the through hole.

The electrode lead may surround the connecting part and be at least partially inserted into the through hole.

Inside the through hole, the electrode lead may be in contact with each of the connecting part and the lower plate.

The connecting part may have a shape corresponding to a shape of the through hole.

The connecting part may include two or more connecting parts and the through hole may include two or more through holes.

A method of manufacturing a busbar module according to another embodiment of the present disclosure includes steps of: positioning an electrode lead between an upper plate having a protruding connecting part and a lower plate having a through hole; and fastening the upper plate and the lower plate with the electrode lead being interposed therebetween, wherein in the fastening step, the connecting part is inserted into the through hole together with the electrode lead.

The connecting part may have a shape which changes according to a temperature rise.

The connecting part may include a shape memory alloy whose shape changes according to a temperature rise.

The fastening of the upper plate and the lower plate can be performed through clinching joint.

Advantageous Effects

According to the embodiments of the present disclosure, the busbar and the electrode lead can be coupled through the fastening structure of the connecting part and the through hole, and the resistance is not increased in a normal operation state, but the current can be effectively blocked in an abnormal operation state.

DETAILED DESCRIPTION OF THE EMBODIMENTS

Figure 1:
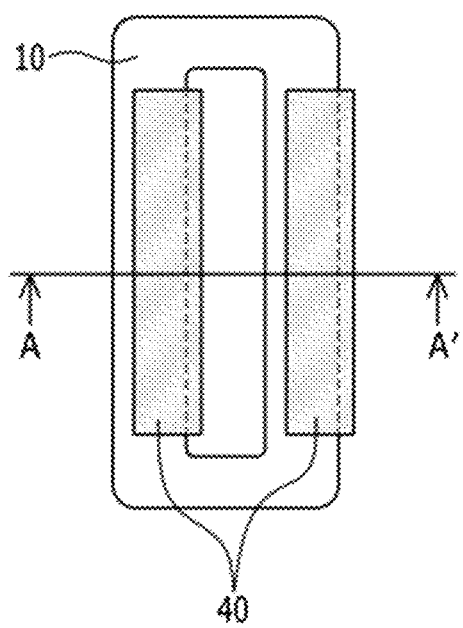
FIG. 1 is a plan view of a conventional busbar module.
Figure 2:
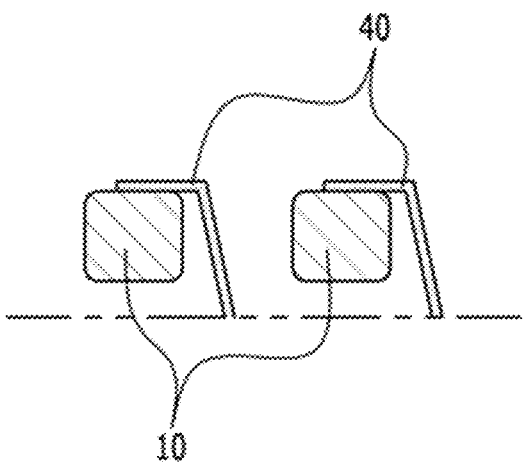
FIG. 2 is a cross-sectional view of the busbar module taken along line A-A' in FIG. 1.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

Figure 3:
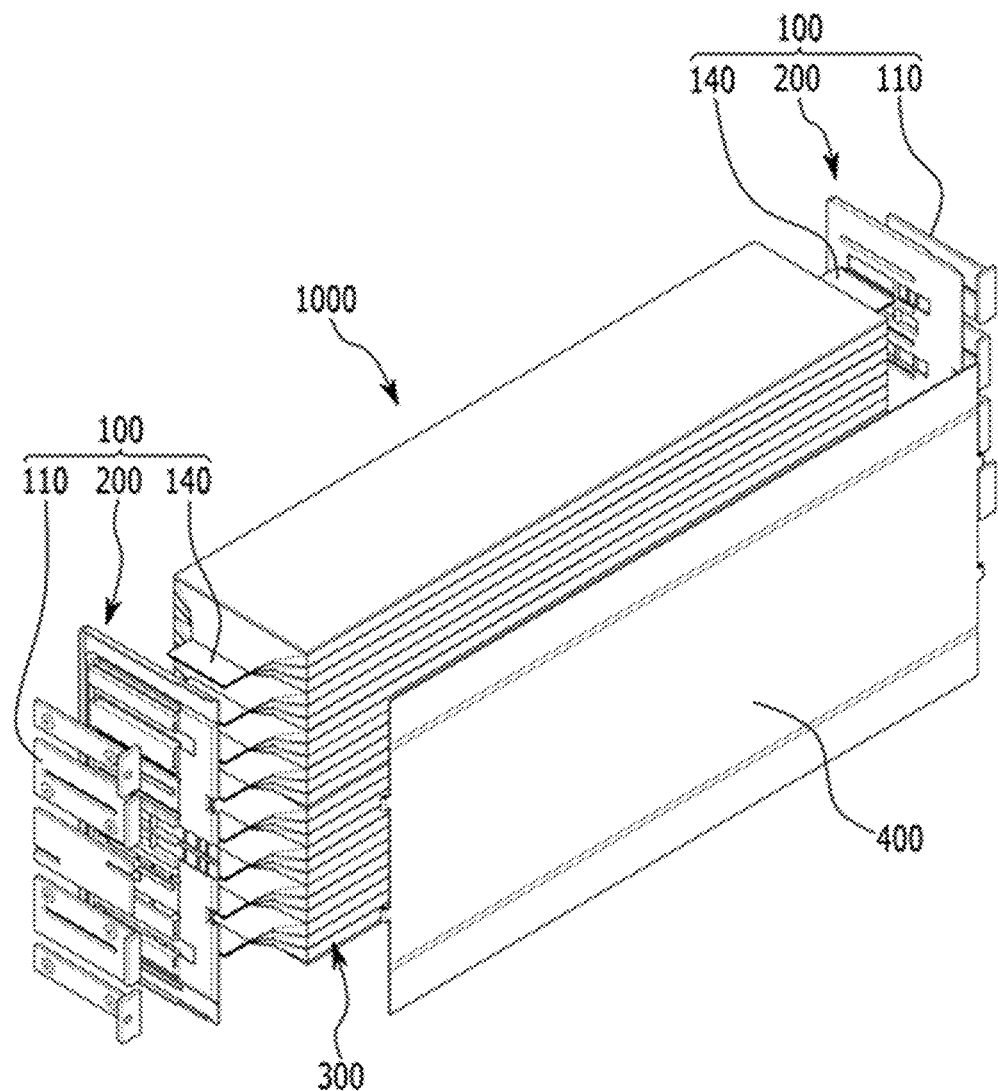
FIG. 3 is an exploded perspective view of a battery module according to one embodiment of the present disclosure.

FIG. 3 is an exploded perspective view of a battery module according to an embodiment of the present disclosure.

Referring to FIG. 3, the battery module 1000 according to the present embodiment includes a plurality of battery cells 300 and a busbar module 100 positioned on both sides of the plurality of battery cells 300. The battery module 1000 may further include a top cover 400 covering the plurality of battery cells 300.

The busbar module 100 includes an electrode lead 140 connected to the plurality of battery cells 300, a busbar 110 connected to the electrode lead 140, and a busbar frame 200 on which the busbar 110 is mounted. A slit is formed in the busbar frame 200, and the electrode lead 140 may pass through the slit to be connected to the busbar 110.

Figure 4:
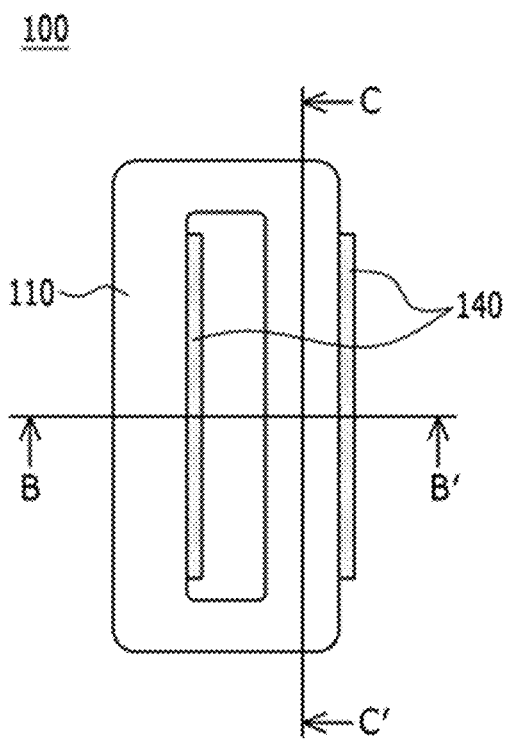
FIG. 4 is a plan view of the busbar module shown in FIG. 3.

FIG. 4 is a plan view of the busbar module 100 shown in FIG. 3, wherein only the busbar 110 and the electrode lead 140 are illustrated, and the other components are not shown.

Figure 5:
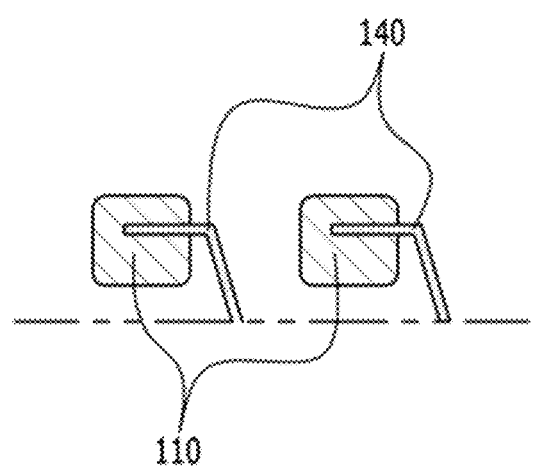
FIG. 5 is a cross-sectional view of the busbar module taken along line B-B' in FIG. 4.
Figure 6:
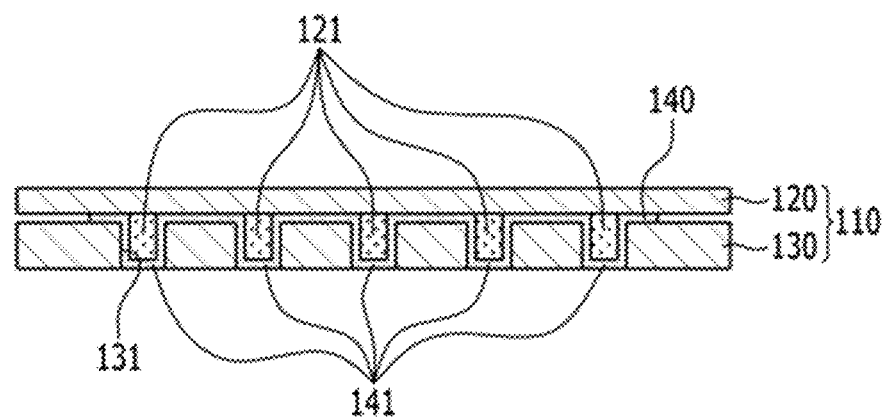
FIG. 6 is a cross-sectional view of the busbar module taken along line C-C' in FIG. 4.

FIG. 5 is a cross-sectional view showing the busbar module along line B-B' in FIG. 4, and FIG. 6 is a cross-sectional view showing the busbar module along line C-C' in FIG. 4.

Referring to FIGS. 4 to 6, the busbar module 100 according to one embodiment of the present disclosure includes a busbar 110 including an upper plate 120 and a lower plate 130 overlapping with the upper plate 120; an electrode lead 140 positioned between the upper plate 120 and the lower plate 130; and a connecting part 121 disposed between the upper plate 120 and the electrode lead 140 to electrically connect the upper plate 120 and the electrode lead 140. Although not shown, the electrode lead 140 is connected to a plurality of battery cells.

A through hole 131 is formed in the lower plate 130, and the connecting part 121 is disposed at a position corresponding to the through hole 131.

Meanwhile, in FIGS. 5 and 6, although the electrode lead 140 engaged between the upper plate 120 and the lower plate 130 is illustrated to be integral, it is also possible that two or more electrode leads 140 are bent in the same direction and overlapped with each other between the upper plate 120 and the lower plate 130.

Figure 7:
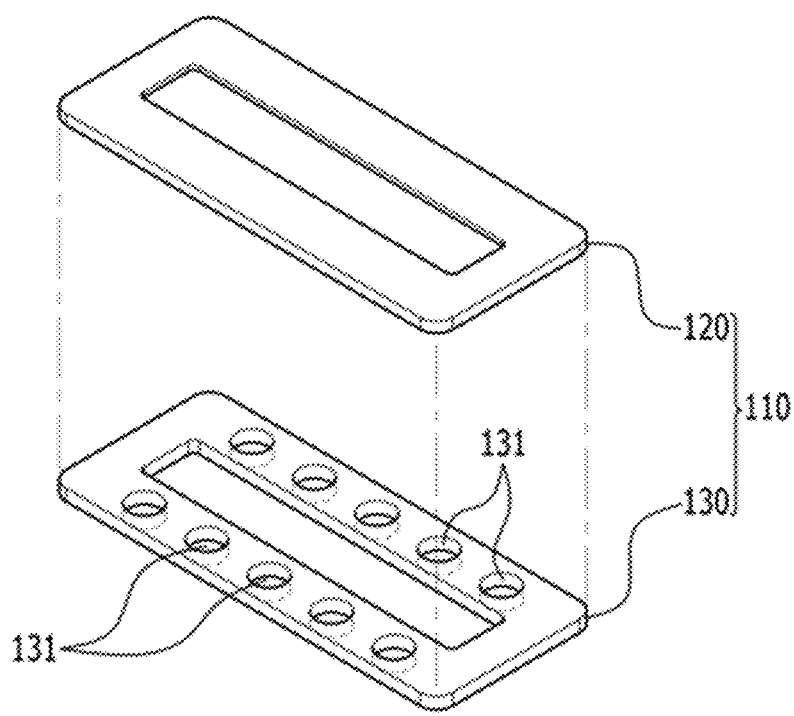
FIG. 7 is a perspective view of the busbar of FIG. 4 before being fastened.

FIG. 7 is a perspective view of the busbar 110 of FIG. 4 before being fastened, wherein the electrode leads, etc. is not shown for convenience of description. As mentioned above, a through hole 131 is formed in the lower plate 130 of the busbar 110. However, although the through hole 131 is shown as a circular shape, its shape is not limited so long as it is perforated through the lower plate 130, and thus a polygonal through hole is also available.

Referring back to FIGS. 4 to 6, the connecting part 121 extends from the upper plate 120 toward the lower plate 130, and can be inserted into the through hole 131 together with the electrode lead 140, wherein the electrode lead 140 may form a structure surrounding the connecting part 121 inside the through hole 131.

Accordingly, unlike the conventional busbar module, the busbar 110 and the electrode lead 140 can be electrically connected through the mechanical fastening of the upper plate 120, the lower plate 130 and the electrode lead 140 positioned between the two plates, without being welded. That is, the electrode lead 140 includes a protrusion 141 formed due to the pressing of the connecting part 121, and the protrusion 141 forms a structure protruding into the through hole 131.

In addition, inside the through hole 131, the electrode lead 140 may be in close contact with each of the connecting part 121 of the upper plate 120 and the lower plate 130. In other words, since the contact area between the busbar 110 and the electrode lead 140 may be increased compared to a conventional welding joint, the contact resistance between the busbar 110 and the electrode lead 140 may be reduced.

Meanwhile, it is preferable that the connecting part 121 has a shape corresponding to that of the through hole 131, in order that the connecting part 121 is inserted into the through hole 131 and is in close contact with the electrode lead 140 inside the through hole 131. For example, when a circular through hole 131 is formed in the lower plate 130 as shown in FIG. 7, it is preferable that the connecting part 121 has a cylindrical shape. In addition, although not shown, when a polygonal through hole is formed, it is preferable that the connecting part has a shape of a polygonal column corresponding thereto.

Further, each of the connecting part 121 and the through hole 131 is not limited to the number thereof, but the number is preferably two or more in order to securely fasten the busbar 110 and the electrode lead 140.

Figure 8:
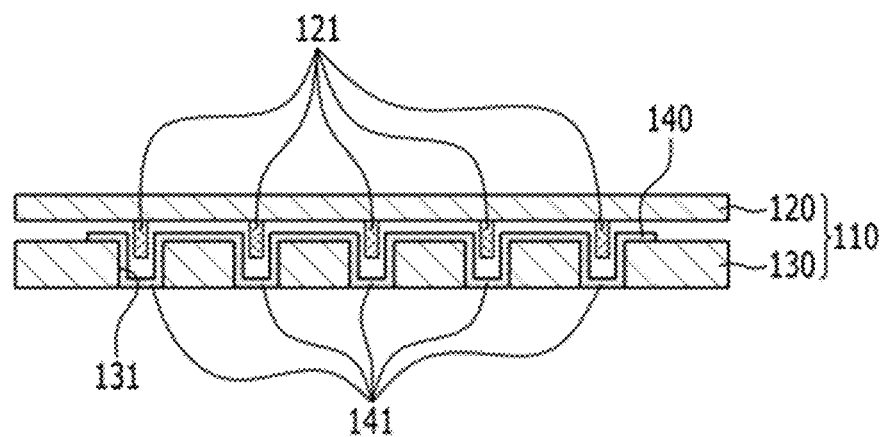
FIG. 8 is a cross-sectional view showing the busbar module of FIG. 6 in an abnormal operating state.

FIG. 8 is a cross-sectional view showing the busbar module of FIG. 6 in an abnormal operating state.

Referring to FIG. 8, when an abnormal operating state such as an overcurrent state or a high temperature state occurs, the connecting part 121 according to the present embodiment increases in temperature, and when the temperature exceeds a certain level, its volume may shrink.

The connecting part 121 may include a material whose volume shrinks as the temperature rises, and such material may include a shape memory alloy. More specifically, the shape memory alloy may be welded with the upper plate 120 and then be nickel plated to form the connecting part 121. In a normal operating state, the electrical conductivity is maintained through the nickel plating, whereas in an abnormal operating state, the temperature rises above a certain temperature and, thus, the volume of the shape memory alloy decreases, which may lead to decrease in the volume of the connecting part 121.

In this case, the temperature at which the volume shrinkage of the shape memory alloy occurs is preferably 100 to 120 degrees Celsius to ensure safety in an abnormal operating state.

As shown in FIG. 8, since the volume of the connecting part 121 shrinks, the connection between the connecting part 121 and the electrode lead 140 becomes loose, and eventually, the connecting force between the upper plate 120 and the electrode lead 140 is reduced, so that the upper plate 120 and the electrode lead 140 may be separated from each other. In this way, the current flowing through the battery cell is cut off, thereby improving safety in an abnormal operating state.

Figure 9:
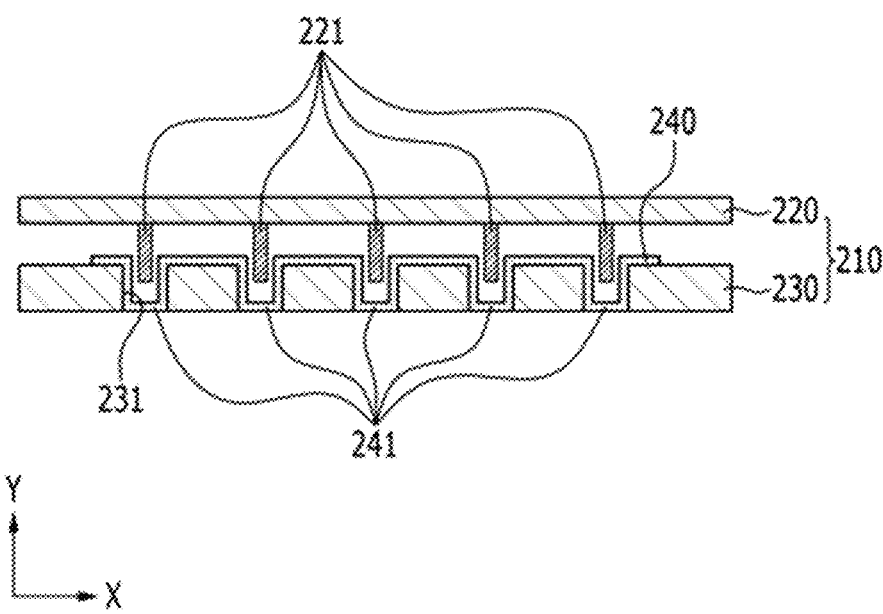
FIG. 9 is a cross-sectional view showing a busbar module according to another embodiment of the present disclosure in an abnormal operating state.

FIG. 9 is a cross-sectional view showing a busbar module according to another embodiment of the present disclosure in an abnormal operating state.

Referring to FIG. 9, a busbar 210 including an upper plate 220 and a lower plate 230, a through hole 231 formed in the lower plate 230, and an electrode lead 240 including a protrusion 241 are equal or similar to those shown in FIG. 8, respectively, and, thus, the descriptions thereon are omitted.

However, the connecting part 221 connected to the upper plate 220 may include a material whose shape changes according to a temperature rise. For example, it may include a shape memory alloy whose shape changes as a temperature exceeds a certain level.

In particular, when the temperature of the connecting part 221 rises due to an abnormal operating state, the width of the connecting part 221 in a direction parallel to the upper plate 220 (X direction) may decrease, and the height of the connecting part 221 in a direction perpendicular to the upper plate 220 may increase. In case the connecting part 221 is cylindrical, a decrease in the width in the direction parallel to the upper plate 220 (X direction) may correspond to a decrease in the diameter of the cylinder, and an increase in the height in the direction perpendicular to the upper plate 220 (Y direction) may correspond to an increase in the height of the cylinder.

As described above, since the width in the direction parallel to the upper plate 220 (X direction) decreases, the connection between the connecting part 221 and the electrode lead 240 becomes loose, and eventually, the connecting force between the upper plate 220 and the electrode lead 240 is reduced, so that the upper plate 220 and the electrode lead 240 may be easily separated from each other. In addition, since the height in the direction perpendicular to the upper plate 220 (Y direction) increases, the connecting part 221 has an effect of pushing the upper plate 220 out of the electrode lead 240 and the lower plate 230, which may be more advantageous in blocking current.

In this regard, since the volume of the connecting part 221 is not limited, the volume of the connecting part 221 may reduce, increase, or maintain as the width decreases and the height increases.

On the other hand, the temperature at which the shape change of the shape memory alloy occurs is preferably 100 to 120 degrees Celsius to ensure safety in an abnormal operating state.

Figure 10:
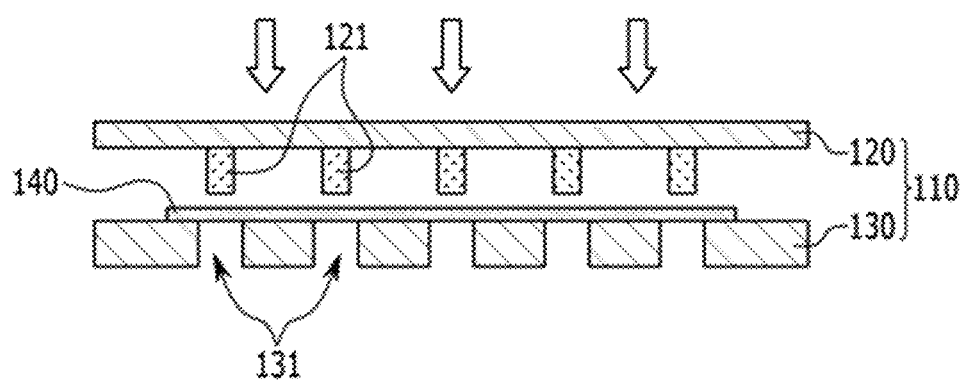
FIG. 10 is a cross-sectional view illustrating a method of manufacturing a busbar module according to an embodiment of the present disclosure.

FIG. 10 is a cross-sectional view illustrating a method of manufacturing a busbar module according to one embodiment of the present disclosure.

Referring to FIG. 10, a method of manufacturing a busbar module according to one embodiment of the present disclosure includes the steps of: positioning an electrode lead 140 between an upper plate 120 having a protruding connecting part 121 formed and a lower plate having a through hole 131 formed; and fastening the upper plate 120 and the lower plate 130 with the electrode lead 140 being interposed therebetween, wherein in the fastening step, the connecting part 121 is inserted into the through hole 131 together with the electrode lead 140.

Unlike a conventional laser welding or ultrasonic welding, the coupling of the busbar 110 and the electrode lead 140 is performed through clinching joint. That is, the upper plate 120 and the lower plate 130 are compressed with the electrode lead 140 being interposed therebetween by using a punch or die of a specified size, thereby causing physical deformation, which leads to the fastening of the upper plate 120, the lower plate 130 and the electrode lead 140.

Meanwhile, the above-described structure and material may be applied to the connecting part 121 and the through hole 131, and therefore, the description thereof will be omitted because it is redundant.

A battery module including the busbar module as described above can be applied to various devices. Such devices include, but are not limited to, transportation means such as an electric bicycle, an electric vehicle, and a hybrid vehicle, and the battery module is applicable to various devices capable of using a secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS AND SYMBOLS

100: busbar module
110: busbar
120: upper plate
121: connecting part
130: lower plate
131: through hole
140: electrode lead
1000: battery module

The invention claimed is:

1. A busbar module comprising:
    a busbar including an upper plate and a lower plate overlapping with the upper plate;
    an electrode lead positioned between the upper plate and the lower plate; and
    a connecting part disposed between the upper plate and the electrode lead to electrically connect the upper plate and the electrode lead,
    wherein a through hole is formed in the lower plate, and
    wherein the connecting part is at least partially received in the through hole.

2. The busbar module of claim 1, wherein the connecting part comprises a material whose volume shrinks according to a temperature rise.

3. The busbar module of claim 2, wherein the material is a shape memory alloy.

4. The busbar module of claim 1, wherein the connecting part has a shape which changes according to a temperature rise.

5. The busbar module of claim 4, wherein the connecting part comprises a shape memory alloy whose shape changes according to a temperature rise.

6. The busbar module of claim 1, wherein the connecting part extends from the upper plate toward the lower plate, and the electrode lead includes a protrusion projecting into the through hole.

7. The busbar module of claim 1, wherein the electrode lead surrounds the connecting part and is at least partially inserted into the through hole.

8. The busbar module of claim 1, wherein the electrode lead is in contact with each of the connecting part and the lower plate inside the through hole.

9. The busbar module of claim 1, wherein the connecting part has a shape corresponding to a shape of the through hole.

10. The busbar module of claim 1, wherein the busbar includes a second connecting part and a second through hole.

11. A battery module comprising the busbar module of claim 1 and a plurality of battery cells.

* * * * *